United States Patent
Mankovskii et al.

(10) Patent No.: US 11,030,520 B2
(45) Date of Patent: Jun. 8, 2021

(54) DISTRIBUTED SECURE TRAINING OF NEURAL NETWORK MODEL

(71) Applicant: CA, Inc., New York, NY (US)

(72) Inventors: Serge Mankovskii, Morgan Hill, CA (US); Steven L. Greenspan, Scotch Plains, NJ (US); Maria C. Velez-Rojas, San Jose, CA (US)

(73) Assignee: CA, Inc.

( * ) Notice: Subject to any disclaimer, the term of this patent is extended or adjusted under 35 U.S.C. 154(b) by 814 days.

(21) Appl. No.: 15/615,051

(22) Filed: Jun. 6, 2017

(65) Prior Publication Data

US 2018/0349769 A1    Dec. 6, 2018

(51) Int. Cl.
*G06N 3/08* (2006.01)
*G06N 3/04* (2006.01)
*G06N 20/00* (2019.01)
*G06F 16/20* (2019.01)
*G06F 16/21* (2019.01)
*G06N 3/063* (2006.01)

(52) U.S. Cl.
CPC ............ *G06N 3/08* (2013.01); *G06F 16/20* (2019.01); *G06F 16/219* (2019.01); *G06N 3/0454* (2013.01); *G06N 3/082* (2013.01); *G06N 20/00* (2019.01); *G06N 3/063* (2013.01)

(58) Field of Classification Search
CPC ........ G06N 3/08; G06N 3/0454; G06N 3/063; G06N 3/082; G06N 20/00; G06N 20/10; G06N 20/20; G06F 16/20; G06F 16/219
See application file for complete search history.

(56) References Cited

U.S. PATENT DOCUMENTS

| 2015/0379430 | A1* | 12/2015 | Dirac | G06N 20/00 706/12 |
| 2018/0232663 | A1* | 8/2018 | Ross | G06N 3/08 |

OTHER PUBLICATIONS

Brad Casey, Breaking down the three stages of cloud data encryption, 2016, https://searchcloudcomputing.techtarget.com/tip/Breaking-down-the-three-stages-of-cloud-data-encryption (Year: 2016).*

(Continued)

*Primary Examiner* — Shane D Woolwine
(74) *Attorney, Agent, or Firm* — Shook, Hardy & Bacon L.L.P.

(57) ABSTRACT

Techniques are disclosed relating to training a neural network using private training data. In some embodiments, a central computing system is configured to maintain an at least partially trained neural network and information that specifies data formats for inputs to the model and outputs from the model. In some embodiments, partner computing systems maintain subsections of the neural network model and may train them using data that is not shared with other partner computing systems or the central computing system. Parameters resulting from the training may be transmitted to the central computing system. In some embodiments, the central computing system processes the parameters to generate the updated complete version of the neural network model and transmits parameters from the updated complete version of the model to the partner computing systems. The partner computing systems may use the updated complete model to detect anomalies in input data.

20 Claims, 7 Drawing Sheets

(56) References Cited

OTHER PUBLICATIONS

Serrano et al, Neural Network Predictor for Fraud Detection: A Study Case for the Federal Patrimony Department, 2012 (Year: 2012).*
Krizhevsky, One weird trick for parallelizing convolutional neural networks, 2014, arxiv.org (Year: 2014).*
Yann LeCun, et al., "Deep learning," Nature, vol. 521, May 28, 2015, pp. 436-444.
Jeffrey Dean, et al. "Large Scale Distributed Deep Networks," Advances in Neural Information Processing Systems 25 (NIPS 2012), 11 pages.
Reza Shokri, et al., "Privacy-Preserving Deep Learning," Proceedings of the 22nd ACM SIGSAC Conference on Computer and Communications Security, CCS '15, Oct. 12-16, 2015, 12 pages.

* cited by examiner

DISTRIBUTED SECURE TRAINING OF NEURAL NETWORK MODEL

BACKGROUND

Technical Field

This disclosure relates generally to neural networks and more particularly to distributed neural network training that keeps training data private.

Description of the Related Art

Neural networks are a computing technique in which a network of nodes is able to learn from a training data set. Neural networks are useful for various applications. It is generally known that the performance of a neural network at a designated task typically increases with the amount of data which has been used to train it. Often, neural networks may be applied to problems where the appropriate training data is private and access to the training data must be restricted. Therefore, sharing this training data to increase neural network performance may be difficult.

SUMMARY

Techniques are disclosed relating to training a neural network using private training data. In some embodiments, a central computing system is configured to maintain an at least partially trained neural network and information that specifies data formats for inputs to the model and outputs from the model. In some embodiments, partner computing systems maintain subsections of the neural network model and may train them using data that is not shared with other partner computing systems or the central computing system. Parameters resulting from the training may be transmitted to the central computing system. In some embodiments, the central computing system processes the parameters to generate the updated complete version of the neural network model. The central computing system may transmit the parameters from the updated complete version of the model to the partner computing systems. In some embodiments, the partner computing systems use the updated complete model to detect anomalies in at least part of the input or training data.

The subsections of the neural network model may be combined by the central computing system in various ways. In some embodiments, the neural network subsections are combined at least partially in series. The hidden layer nodes from the respective subsections may be used as separate, successive hidden layers in the combined model. In some embodiments, the neural network subsections are combined at least partially in parallel. The hidden layer nodes from multiple respective subsections may be used to form a single hidden layer in the combined model, in some embodiments.

In some embodiments, the partner computing systems use the neural network models to detect anomalous features in one or more sets of input data. The input data may be the same data as the training data, it may be a subset of the training data, or it may be entirely different data. In some embodiments, detection is performed on multiple different sets of input data as new data is acquired.

In various embodiments, disclosed techniques may secure sensitive input data at partner computing systems while allowing the different partner computing systems to benefit from parameters from the complete model.

Figure 1:
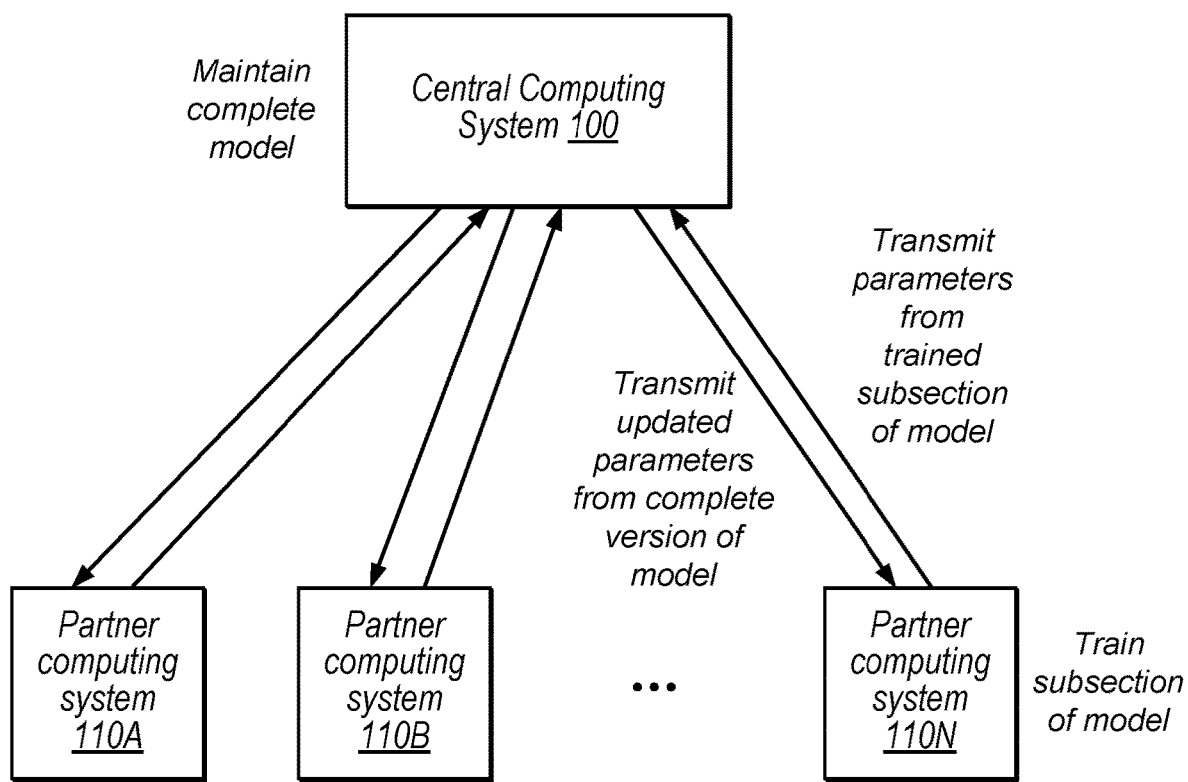
FIG. 1 shows a central computing system configured to exchange neural network information with multiple partner computing systems, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "mobile device configured to generate a hash value" is intended to cover, for example, a mobile device that performs this function during operation, even if the device in question is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Techniques for training a neural network are disclosed herein, where, in some embodiments, the training is performed using cooperation between a central computing system 100 and multiple partner computing systems 110. In some embodiments, the input data used for training may not be shared by ones of the partner computing systems 110 with the central computing system 100 or with other partner computing systems 110. This may allow improved training, relative to techniques that do not coordinate between multiple systems, while still allowing sensitive input data to remain private, in various embodiments.

Exemplary Distributed Neural Network Processing

FIG. 1 is a block diagram illustrating a system that includes a central computing system 100 and a number of partner computing systems 110A-110N. The number of partner computing systems 110 may vary in different embodiments and/or may be changed during the course of operation of the system. The central computing system 100, in some embodiments, is configured to maintain the complete neural network model and process parameters from the partner computing system to update the complete neural network model. The partner computing systems 110, in some embodiments, are configured to train a subsection of the neural network model using data which may be private and transmit the parameters from training of the respective subsection to the central computing system 100.

The term "neural network" is intended to be construed according to its well-understood meaning in the art, which includes a computational model that uses a number of nodes, where the nodes exchange information according to a set of parameters and functions. Each node is typically connected to many other nodes, and links between nodes may be enforcing or inhibitory in their effect on the activation of connected nodes. The nodes may be connected to each other in various ways; one example is a set of layers where each node in a layer sends information to all the nodes in the next (although in some layered models, a node may send information to only a subset of the nodes in the next layer). A more detailed overview of neural networks is provided below with reference to FIG. 6.

The central computing system 100 of FIG. 1 may be a single computing device or multiple computing devices (e.g. a distributed system connected over a network such as the internet), in some embodiments. In some embodiments, the central computing system 100 is configured to store information regarding the set of partner computing systems 110 and information regarding a protocol with which to exchange data. It may also maintain and may provide information that specifies format to be used for input data.

The partner computing systems 110A through 110N of FIG. 1 may each be single computing devices or multiple computing devices (e.g. a distributed system connected via a network), in some embodiments. Each partner computing system is configured to maintain a set of neural nodes configured to be a subsection of the complete neural network model maintained by the central computing system 100, in some embodiments. Each partner computing system may have access to a set of data which may conform to the format specified by the central computing system 100 and may use this data to train the subsection of the complete neural network model which it maintains. In some embodiments, this input data may be private information that is not shared with either the central computing system 100 or other partner computing systems 110. This information may be of a nature such that sharing is restricted or forbidden, e.g. financial transaction data, medical data, or crime data. In some embodiments, the partner computing systems 110 are configured to transmit parameters that result from training on their subsection of the neural network model to the central computing system 100.

In some embodiments, the central computing system 100 is configured to receive parameters from the partner computing systems 110 corresponding to the subsection of the neural network model maintained by each partner computing system. It may, in some embodiments, combine the parameters received from the plurality of partner computing system to create the complete neural network model. Examples of combining the neural network subsections are discussed in more detail below. In some embodiments, the central computing system 100 is configured to transmit the parameters for the complete version of the model to each of the partner computing systems 110. In some embodiments, the central computing system 100 is configured to perform training on the complete neural network model as well, e.g., using its own training data which may or may not be shared with the partner computing systems 110.

The partner computing systems 110, in some embodiments, may maintain a version of the complete neural network model from the central computing system 100 and may update their version based on received parameters from the central computing system 100. In some embodiments, the partner systems may use the complete version of the model to make predictions based on their input data. The configuration of FIG. 1 may be advantageous in that secure input data need not be shared (but may be maintained at each partner computing system) while each partner system may utilize knowledge from training using the complete model, which incorporates information from multiple partner systems. This may improve the accuracy of predictions and alerts from processing by the subsections of the ones of the partner systems.

Figure 2:
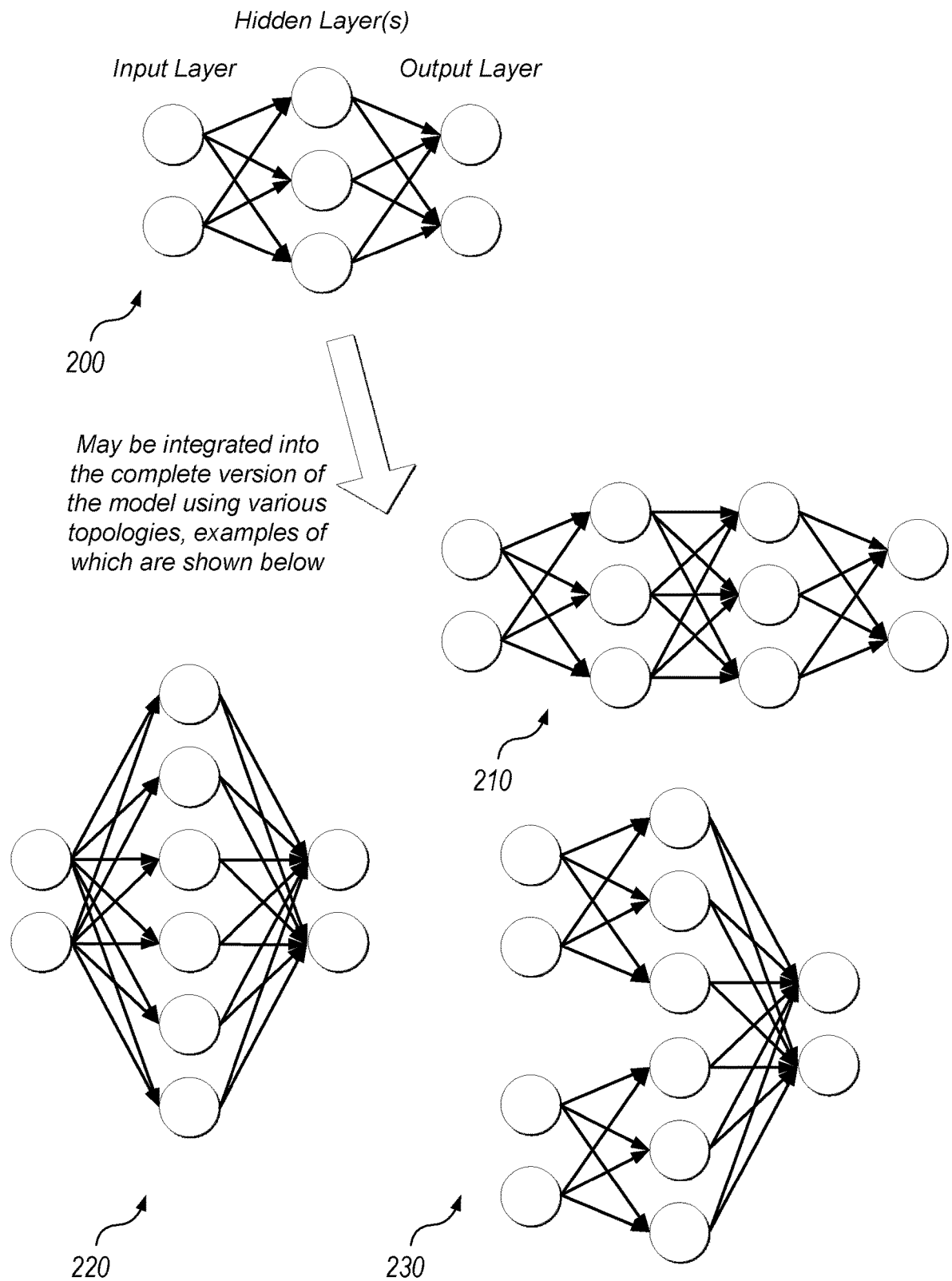
FIG. 2 illustrates various exemplary embodiments of combining partially trained neural networks into a complete neural network model.

FIG. 2 illustrates several non-limiting examples of ways in which the neural networks from the partner computing systems 110 may be combined into the complete model. The neural network 200 represents an exemplary embodiment of a neural network subsection of a partner system; other embodiments may have other numbers of nodes organized into other numbers of layers, with other numbers of connections.

In some embodiments, the neural network subsections are combined at least partially in series, as shown in configuration 210 of FIG. 2. The hidden layer nodes from the respective subsections may be used as separate, successive hidden layers in the combined model, in some embodiments, such that the set of hidden layer(s) from one partner system receives input from a set of hidden layer(s) from a second partner system and also generates input for a set of hidden layer(s) from a third partner system. Configuration 210 illustrates an embodiment of the combination of two subsections for purposes of illustration; in other embodiments more subsections may be combined in a similar fashion, each layer of hidden nodes connected to the next, with the input layer and output layer at the beginning and end, respectively. A node from one hidden layer may be connected to each node of the next hidden layer in some embodiments, or nodes may be connected to some subset of the nodes in the next layer in other embodiments. Further, in some embodiments, nodes may be connected to layers that are not adjacent to the layer in which the node resides and/or may connect to preceding layers in the neural network.

In some embodiments, the neural network subsections are combined at least partially in parallel, as shown in configuration 220 of FIG. 2. The hidden layer nodes from multiple respective subsections may be used to form a single hidden layer in the combined model, in some embodiments. In some embodiments, each node in the input layer is connected to each node in the hidden layer and each node in the hidden layer is connected to each node in the output layer. Configuration 220 illustrates an example of the combination of two subsections for purposes of illustration; in other embodiments more subsections may be combined in a similar fashion.

In some embodiments, the neural network subsections are at least partially combined as shown in configuration 230, from FIG. 2, where the respective subsections are combined in parallel as described with reference to configuration 220, but the input layer nodes do not connect to each node of the hidden layer. Each separate node of the input layer may connect to some or all of the nodes in the hidden layer in some embodiments. Configuration 230 illustrates an example of the combination of two subsections for purposes of illustration; in other embodiments more subsections may be combined in a similar fashion.

Those skilled in the art may devise various other ways to combine subsections of the neural network, separately and/or in combination with the disclosed configurations. This disclosure does not discuss all possible ways of combining neural network subsections and is not intended to limit the ways in which the neural network subsections may be combined.

Exemplary Methods

Figure 3:
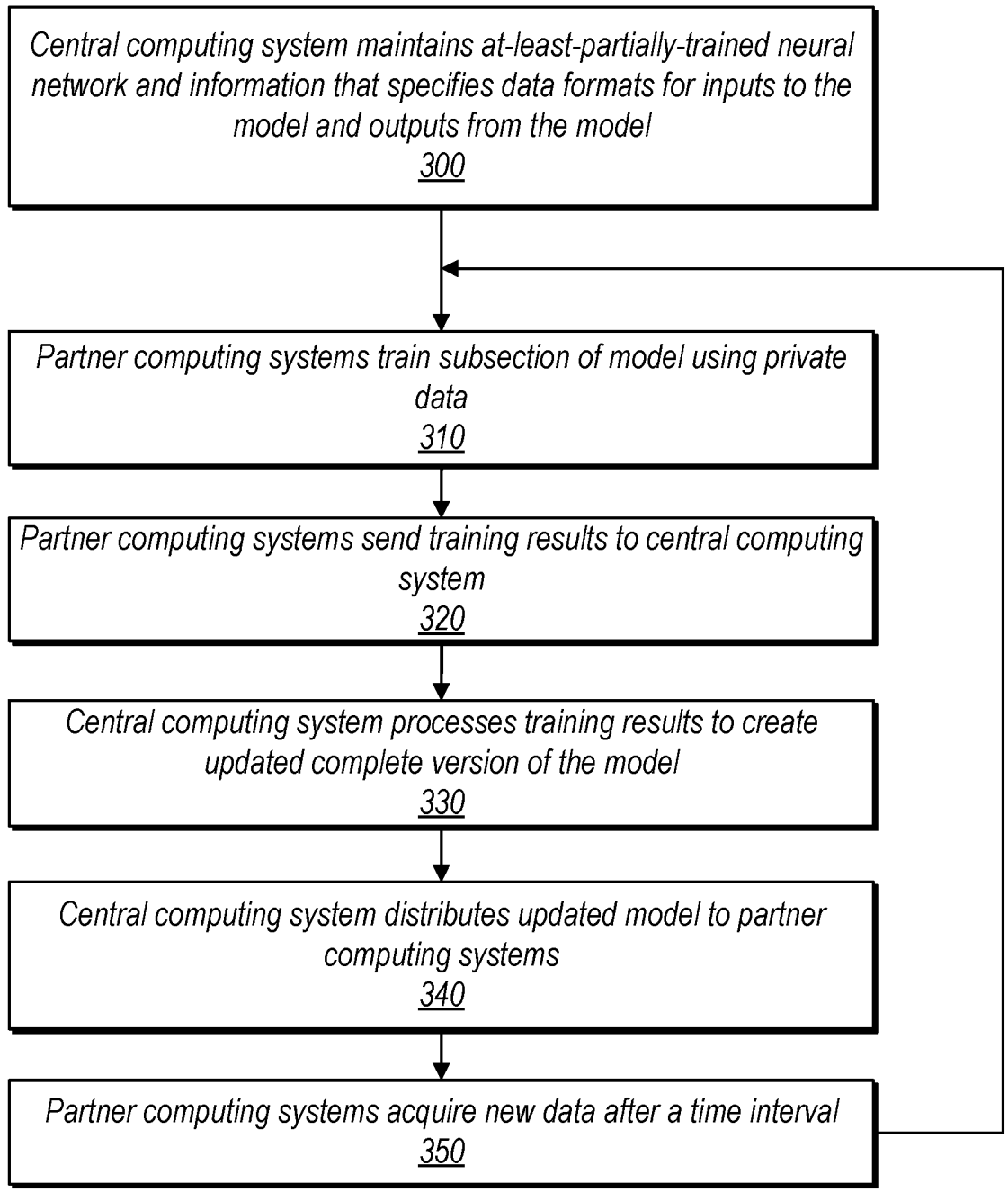
FIG. 3 is a flow diagram illustrating a method in which a central computing system communicates with partner computing systems to update a neural network model, according to some embodiments.

FIG. 3 is a flow diagram illustrating a method for training a neural network, according to some embodiments. The method shown in FIG. 3 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 300 in the illustrated embodiment, the central computing system 100 maintains a neural network model which is at least partially trained. The central computing system 100 also maintains, in the illustrated embodiment, information that specifies data formats for inputs to the model and outputs from the model. In some embodiments, this information may be made available to the partner computing systems 110, which may use it to maintain their neural network models.

At 310 in the illustrated embodiment, the partner computing systems 110 train the respective subsections of the model using private data. This data is data that may not be shared with the central computing system 100 or other partner computing systems 110. In some embodiments, this data may be confidential information from clients or customers, financial transaction data, healthcare-related data, etc.

At 320 in the illustrated embodiment, the partner computing systems 110 transmit the results from training their respective neural network subsections to the central computing system 100. In some embodiments, this includes weights from the neural network subsection, descriptions of the neural network connection structure, or other information relating to the performance of the neural network. The input data used for training may or may not include input data used for actual processing. For example, the training input data may correspond to previously-processed input data while new input data may be processed based on updated parameters from central computing system 100.

At 330 in the illustrated embodiment, the central computing system 100 processes the training results to create an updated complete version of the model. The complete model may be created by combining the respective subsections of the model as described previously and illustrated in FIG. 2. This updated complete version of the model may include the partially trained model maintained by the central computing system 100 in previous steps. The central computing system 100 may perform any of various appropriate operations on the parameters received from the partner systems (e.g., weights, etc.) in order to incorporate the parameters into the complete model.

At 340 in the illustrated embodiment, the central computing system 100 distributes the updated complete version of the model to the partner computing system. In some embodiments, this may include transmitting or transferring weights from the neural network, descriptions of the neural network connection structure, or other information relating to the performance of the neural network.

At 350 in the illustrated embodiment, the partner computing systems 110 acquire new data after some time (this may occur in real-time as new input data is available, using periodic batching, etc.). In some embodiments, the partner computing systems 110 may continually or at regular or irregular intervals acquire new data which may be used for training the neural network model and/or may be processed using a respective neural network subsection.

Following 350 in the illustrated embodiment, the central and partner computing systems 110 return to step 310 and continue to perform the described actions. In some embodiments, this method is an ongoing process. The partner computing systems 110 and the central computing system 100 may train new data and process the parameters to update the model on a regular or irregular basis in some embodiments.

Figure 4:
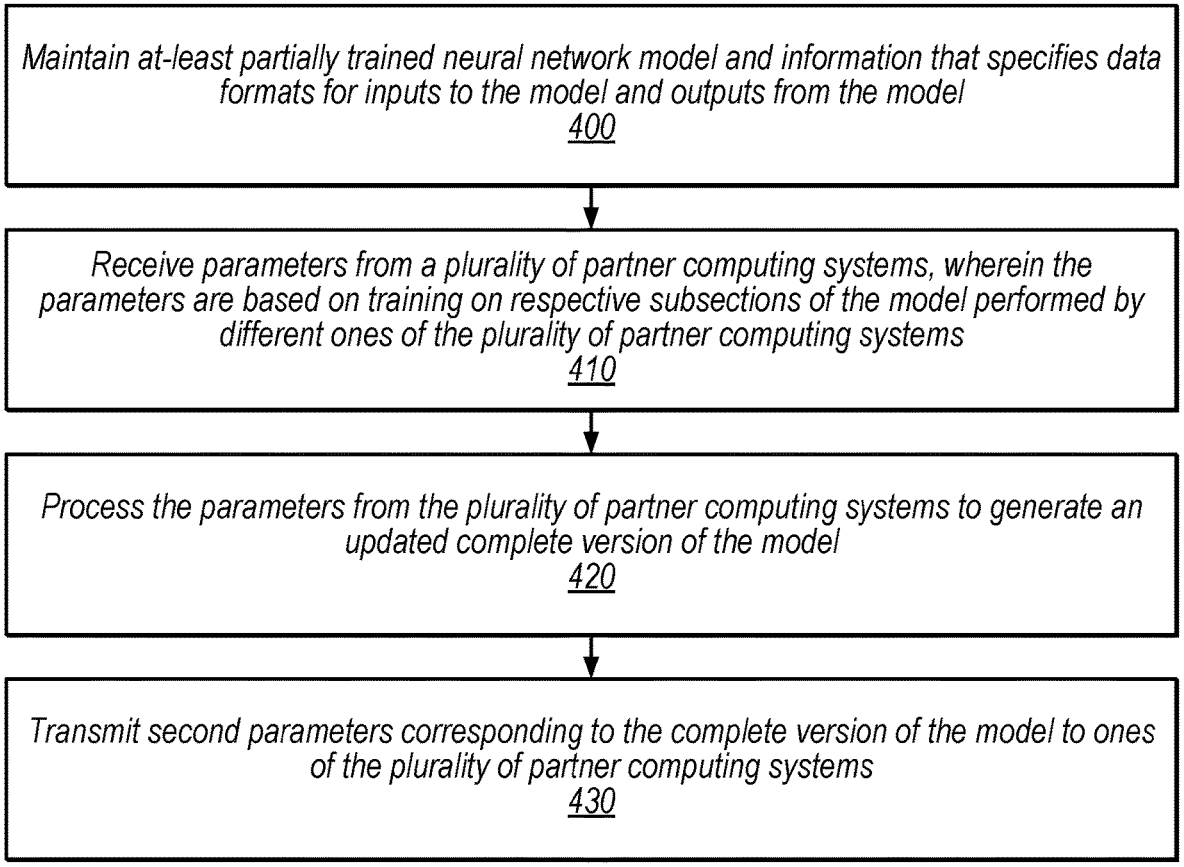
FIG. 4 is a flow diagram illustrating a method performed by a central computing system, according to some embodiments.

FIG. 4 is a flow diagram illustrating method performed by a central computing system 100 for training a neural network, according to some embodiments. The method shown in FIG. 4 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 400 in the illustrated embodiment, the central computing system 100 maintains a neural network model which may be partially trained. The central computing system 100 also may maintain information that specifies data formats for inputs to the model and outputs from the model. In some embodiments, this information may be made available to the partner computing systems 110, which may use it to maintain their neural network models.

At 410 in the illustrated embodiment, the central computing system 100 receives parameters from a plurality of partner computing systems 110 and the parameters are based on training on respective subsections of the model performed by different ones of the plurality of partner computing systems 110. In some embodiments, the system does not receive input data used to perform the training on the respective subsections of the model. In some embodiments, the parameters include weights from the neural network, descriptions of the neural network connection structure, or other information relating to the performance of the neural network.

At 420 in the illustrated embodiment, the central computing system 100 processes the parameters from the plurality of partner computing systems 110 to generate an updated complete version of the model. The complete model may be created by combining the respective subsections of the model, examples of which were described above with reference to FIG. 2. This updated complete version of the model may include the partially trained model maintained by the central computing system 100 in previous steps.

At 430 in the illustrated embodiment, the central computing system 100 transmits second parameters corresponding to the complete version of the model to ones of the plurality of partner computing systems 110. In some embodiments, this may include transmitting weights from the neural network, descriptions of the neural network connection structure, or other information relating to the performance of the neural network.

Figure 5:
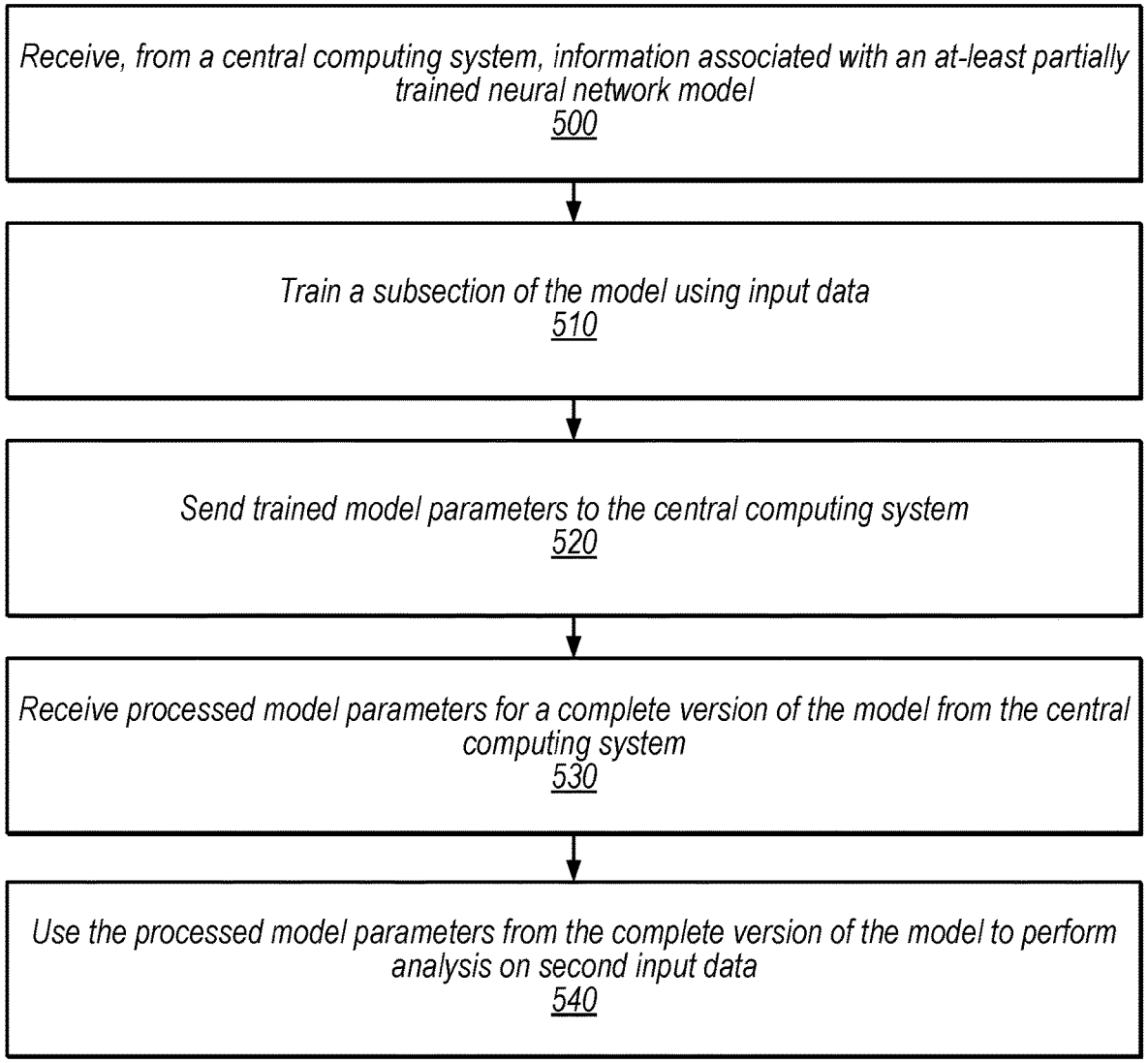
FIG. 5 is a flow diagram illustrating a method performed by a one or more partner computing systems, according to some embodiments.

FIG. 5 is a flow diagram illustrating a method performed by a partner computing system for training a neural network, according to some embodiments. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 500 in the illustrated embodiment, the partner computing system receives, from a central computing system 100, information associated with an at-least partially trained neural network model.

At 510 in the illustrated embodiment, the partner computing system trains a subsection of the model using first input data, wherein the central computing system 100 does not receive input data used to perform the training on the subsection of the model.

At 520 in the illustrated embodiment, the partner computing system sends trained model parameters to the central computing system 100 based on the training.

At 530 in the illustrated embodiment, the partner computing system receives processed model parameters for a complete version of the model from the central computing system 100.

At 540 in the illustrated embodiment, the partner computing system uses the processed model parameters from the complete version of the model to perform analysis on second input data.

In some embodiments, information transmitted between the central computing system 100 and the partner computing systems 110 is encrypted. Information that may be encrypted includes but is not limited to the trained model parameters, the updated complete model, etc.

Examples of Processing Tasks

In some embodiments, the partner computing systems 110 use the neural network models to detect anomalous features in one or more sets of input data. The input data may be the same data as the training data, it may be a subset of the training data, or it may be entirely different data. In some embodiments, detection is performed on a regular basis as new data is acquired.

In some embodiments, the training and input data includes financial transaction data. The anomalous events detected may include fraudulent transactions, erroneous data, system malfunctions etc. In other embodiments, the training and input data includes medical data. Anomalous events may include adverse health outcomes, insurance fraud etc. In other embodiments, the training and input data includes data relevant to criminal matters. Anomalous events may include crime increases or decreases, unusual occurrences, etc. Sharing these example types of input data may be restricted or forbidden, e.g., to avoid sensitive user information being leaked that could be embarrassing or used to impersonate an individual. Those skilled in the art may be familiar with other sources of data that may be used to train a neural network and other anomalous events which may be detected; the exemplary types of data discussed herein are included for purposes of explanation but are not intended to limit the scope of the present disclosure.

In some embodiments, when an anomalous event is detected, the partner computing system 110 sends an alert. The alert may be sent in multiple ways, including by email, by messaging a mobile device, or by otherwise notifying an operator of the partner computing system 110.

Neural Network Overview

Figure 6:
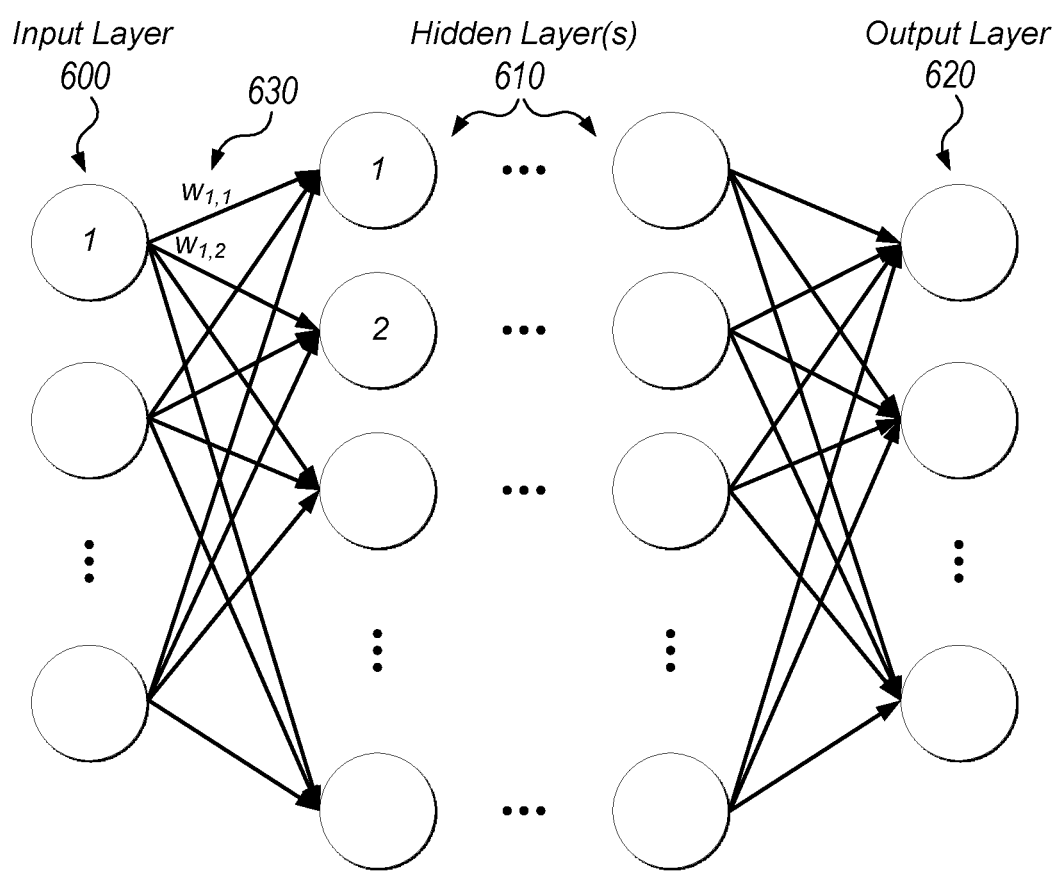
FIG. 6 illustrates an overview of a neural network, according to some embodiments.

FIG. 6 shows an exemplary neural network, a computing structure commonly known in the art. A neural network may be implemented in hardware, e.g. as a network of processing elements, in software, e.g. as a simulated network, or otherwise in some embodiments. A neural network includes of a set of nodes which receive inputs, process those inputs, and send outputs. In some embodiments, the processing involves combining the received inputs according to a set of weights 630 which the node maintains, and then using that result with an activation function to determine what value to output. A complete neural network may be made up of an input layer 600, an output layer 620, and one or more hidden layers 610. The nodes in the input layer 600 and output layer 620 present a special case; the input nodes send input values to the nodes in the hidden layers(s) and do not perform calculations on those values and the nodes of the output layer do not pass outputs to other nodes.

Combining and processing input signals to produce an output may be performed in various ways which will be familiar to someone skilled in the art. One embodiment involves summing the product of the input value and the respective weight 630 for each node that sends input. This value is then input to an activation function which returns a value to send as output to the next node. Examples of activation functions include, without limitation, a sigmoid function or a hyperbolic tangent.

A neural network may be configured to have a variety of connection structures. In some embodiments, as shown in FIG. 6, each node may connect to all of the nodes in the next layer, where "next" indicates towards the right in FIG. 6, and is defined by the direction from input to output. Neural networks may be configured to have an arbitrary number of hidden layers, and all layers, including input and output Layers, may have an arbitrary number of nodes, as indicated by the ellipses in FIG. 6. In some embodiments, neural networks may have some connections which send information to previous layers and/or connections which skip layers.

Neural networks are configured to learn by processing training data. In some embodiments, training data is data which has been labeled so that the output of the neural network can be compared to the labels. Learning may be accomplished by minimizing a cost function which represents the difference between the labeled results and the neural network outputs; one example is the least squares method. In order to improve results, the connection weights may be adjusted. One embodiment of this method is referred to as backpropagation, which involves computing an error term for each connection, moving from the output to the input. In some embodiments, objective functions of the neural network may be relatively smooth functions of their inputs and internal weights, which may increase the suitability of certain learning methods (e.g. backpropagation, etc.). Other embodiments of training methods include gradient descent methods (for example asynchronous stochastic gradient descent), quasi-Newton methods, variations of Broyden-Fletcher-Goldfarb-Shanno algorithms, etc. Other learning methods may be known or discovered by those skilled in the art.

The output of a neural network may be determined by the number of layers and nodes of the neural network, the connection structure, the set of weights, and the activation functions. Due to the ability of neural networks to learn, uses include classification, regression, and data processing, among others.

Exemplary Device

In some embodiments, any of various operations discussed herein may be performed by executing program instructions stored on a non-transitory computer readable medium. Such program instructions may be executed using the central computing system 100 or ones of the partner computing systems 110, for example. In these embodiments, the non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

Figure 7:
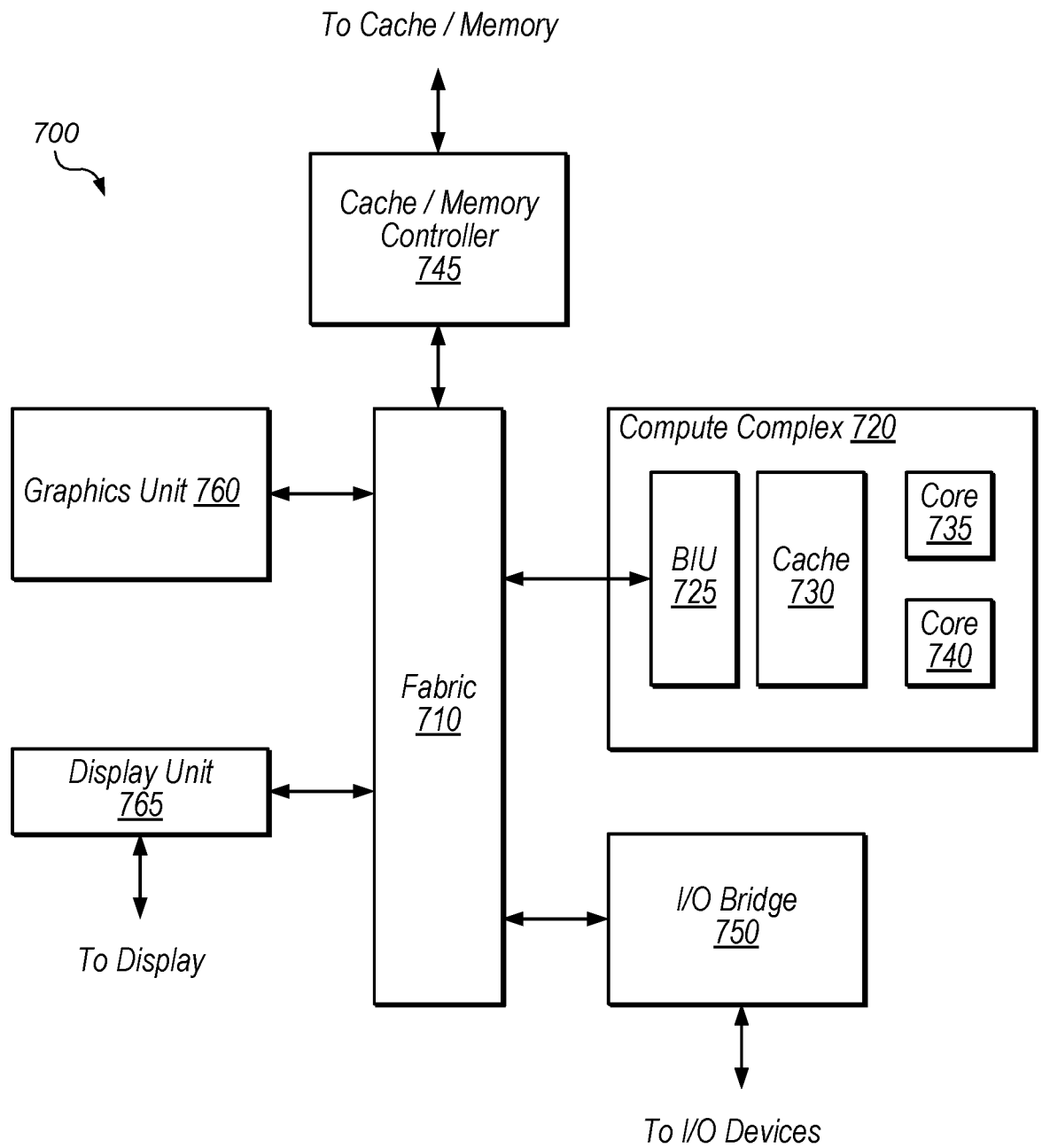
FIG. 7 is a block diagram illustrating an embodiment of a computing device.

Referring now to FIG. 7, a block diagram illustrating an exemplary embodiment of a device 700 is shown. The illustrated processing elements may be used to implement all or a portion of systems 100 and/or 110, in some embodiments. In some embodiments, elements of device 700 may be included within a system on a chip. In the illustrated embodiment, device 700 includes fabric 710, compute complex 720, input/output (I/O) bridge 750, cache/memory controller 745, graphics unit 760, and display unit 765.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 760 may be described as "coupled to" a memory through fabric 710 and cache/memory controller 745. In contrast, in the illustrated embodiment of FIG. 7, graphics unit 760 is "directly coupled" to fabric 710 because there are no intervening elements.

Graphics unit 780 may include one or more processors and/or one or more graphics processing units (GPU's). Graphics unit 780 may receive graphics-oriented instructions, such as OPENGL® or DIRECT3D® instructions, for example. Graphics unit 780 may execute specialized GPU instructions or perform other operations based on the received graphics-oriented instructions. Graphics unit 780 may generally be configured to process large blocks of data in parallel and may build images in a frame buffer for output to a display. Graphics unit 780 may include transform, lighting, triangle, and/or rendering engines in one or more graphics processing pipelines. Graphics unit 780 may output pixel information for display images.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    maintaining, by a computing system, an at-least partially trained neural network model and information that specifies data formats for inputs to the model and outputs from the model;
    receiving, by the computing system, first parameters from a first partner computing system, wherein the first parameters correspond to a trained first subsection of the model, and wherein the first partner computing system does not train any other subsection of the model, and wherein the first subsection includes a first set of nodes of a first layer;
    receiving, by the computing system, second parameters from a second partner computing system, wherein the second parameters correspond to a trained second subsection of the model and, and wherein the second partner computing system does not train any other subsection of the model, and wherein the second subsection includes a second set of nodes of a second layer;
    generating an updated complete version of the model based at least in part on connecting the first set of nodes of the first subsection of the model to the second set of nodes of the second subsection of the model; and
    at least partially in response to the connecting of the first set of nodes to the second set of nodes, transmitting, by the computing system, third parameters corresponding to the complete version of the model to the first partner computing system and the second partner computing system, wherein the first partner computing system receives information associated with the second set of nodes, and wherein the second partner computing system receives information associated with the first set of nodes.

2. The method of claim 1, wherein the generating of the complete version of the model uses the parameters from the first partner computing system and the second partner computing system to form successive layers in the complete neural network model.

3. The method of claim 1, further comprising:
    receiving parameters and transmitting processed parameters based on updated complete versions of the model for input data from multiple different time intervals.

4. The method of claim 1 wherein the first parameters and the second parameters transmitted and received between the computing system and the partner computing systems are encrypted.

5. The method of claim 1, wherein the third parameters are usable by the first partner computing systems to detect anomalous features of one or more sets of input data.

6. The method of claim 1, wherein the input data is not shared with the computing system or the first partner computing system and the second partner computing system.

7. The method of claim 1, wherein the third parameters are usable by ones of the plurality of partner computing systems to detect fraudulent transactions.

8. A system, comprising:
    one or more processing elements;
    and one or more memories having instructions stored thereon that are executable by the one or more processing elements to:
    store an at-least partially trained neural network model and information that specifies data formats for inputs to the model and outputs from the model;
    receive parameters from each partner computing system of a plurality of partner computing systems, wherein the parameters correspond to results from training on a respective subsection of the model, the training is completed by different ones of the plurality of partner computing systems for only the respective subsection and no other subsection of the model, wherein the system does not receive input data used to perform the training on the respective subsections of the model, a first subsection of the model having a first set of nodes is received from a first partner computing system, a second subsection of the model having a second set of nodes is received from a second partner computing system;
    process the parameters from the plurality of partner computing systems to generate an updated complete version of the model based on connecting the first set of nodes to the second set of nodes; and
    transmit second parameters corresponding to the complete version of the model to ones of the plurality of partner computing systems.

9. The system of claim 8 wherein the input data of ones of the partner computing systems is not shared with the computing system or other ones of the partner computing systems.

10. The system of claim 8, wherein the instructions are further executable to:
    receive the parameters based on training on subsections and transmit processed parameters based on updated complete versions of the model for input data from multiple different time intervals.

11. The system of claim 8, wherein the instructions are further executable to:
    generate the updated complete version of the model by using the parameters from the respective subsections of the model from the plurality of partner computing systems to form successive layers in the complete neural network model.

12. The system of claim 8, wherein the instructions are further executable to:
    generate the updated complete version of the model by using the parameters from respective subsections of the model from multiples ones of the plurality of partner computing systems to form a single layer in the complete neural network model.

13. The system of claim 8, wherein the second parameters are usable by ones of the plurality of partner computing systems to detect anomalous features of sets of input data.

14. A system, comprising:
    one or more processing elements;
    one or more memories having instructions stored thereon that are executable by the one or more processing elements to:
    receive, from a central computing system, information associated with an at-least partially trained neural network model;

train, by a first partner computing system, only a first subsection of the model using first input data, wherein the central computing system does not receive input data used to perform the training on the subsection of the model, the first subsection includes a first set of nodes of a first layer;

train, by a second partner computing system, only a second subsection of the model using second input data, the second subsection includes a second set of nodes of a second layer;

send trained model parameters from the first partner computing system and the second partner computing system to the central computing system and connect the first set of nodes of the first subsection to the second set of nodes to the second subsection based on the training;

generate a complete version of the model with the connected first set of nodes and second set of nodes from the central computing system based at least in part on the sending; and in response to the generating of the complete version of the model, use the processed model parameters from the complete version of the model to perform analysis on other input data.

15. The system of claim 14, wherein the instructions are further executable to:

receive processed parameters based on updated complete versions of the model and transmit trained parameters for input data from multiple different time intervals.

16. The system of claim 14, wherein the sent parameters are encrypted.

17. The system of claim 14, wherein the instructions are further executable to:

detect anomalous features of the input data when performing the analysis on the other input data using the processed model parameters.

18. The system of claim 14, wherein the input data represents financial transactions.

19. The system of claim 18, wherein the instructions are further executable to:

detect fraudulent transactions when performing the analysis on the other input data using the processed model parameters.

20. The system of claim 14, wherein the input data represents health information.

* * * * *